United States Patent [19]

Nicholson et al.

[11] Patent Number: 4,828,803

[45] Date of Patent: May 9, 1989

[54] SWIMMING POOL CHEMICAL DISPENSER AND METHOD OF MAKING SAME

[75] Inventors: Donald Nicholson, Canoga Park; Robert Nordmyer, Woodland Hills, both of Calif.

[73] Assignee: Aquality, Inc., Chatsworth, Calif.

[21] Appl. No.: 104,501

[22] Filed: Oct. 5, 1987

[51] Int. Cl.$^4$ ............................................. B01D 12/00
[52] U.S. Cl. ........................................ 422/264; 4/222; 137/268; 239/59; 239/310; 239/315; 422/265; 422/278; 422/279
[58] Field of Search ................... 422/264, 264 B, 265, 422/266, 266 H, 276, 277, 278, 119, 169, 49; 210/164; 137/268; 222/190; 239/58, 59, 458, 310, 315; 4/222, 227, 228

[56] References Cited

U.S. PATENT DOCUMENTS

| | | | |
|---|---|---|---|
| 3,202,322 | 8/1965 | Cleary et al. | 422/265 |
| 3,598,536 | 8/1971 | Christensen | 422/264 B |
| 3,607,103 | 9/1971 | Kiefer | 422/264 B |
| 3,758,276 | 9/1973 | Bond et al. | 422/264 B |
| 4,154,398 | 5/1979 | Gualandi | 239/59 |
| 4,217,331 | 8/1980 | Schaub | 422/265 |
| 4,473,533 | 9/1984 | Davey | 422/265 |
| 4,630,634 | 12/1986 | Sasaki et al. | 422/265 |
| 4,702,270 | 10/1987 | King, Sr. | 422/265 |

Primary Examiner—Barry S. Richman
Assistant Examiner—Timothy M. McMahon
Attorney, Agent, or Firm—John J. Posta, Jr.

[57] ABSTRACT

A device for use in a swimming pool to continuously dispense chlorine for sanitizing the water is disclosed which is advantageously made of five main segments which may be molded using only simple and inexpensive molds. The device is for the most part snapped together in a manner preventing relative rotation of the various components, with only a single adhesive operation required to seal the waterproof float assembly. The device is manufactured in a sturdy fashion, with all the parts being held firmly together in a unit not dependent on single axis connecting hardware.

13 Claims, 4 Drawing Sheets

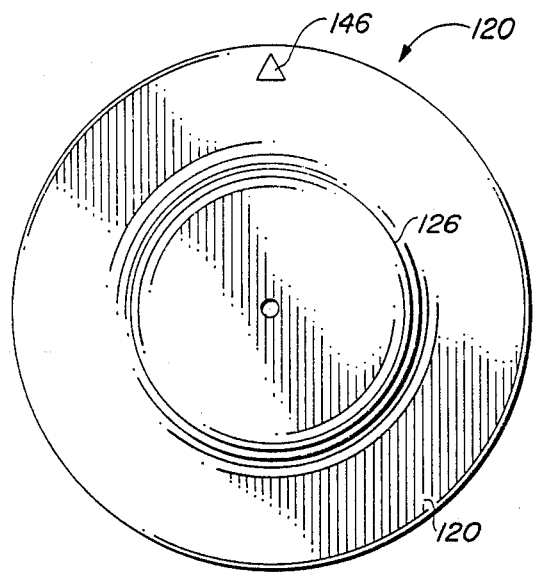
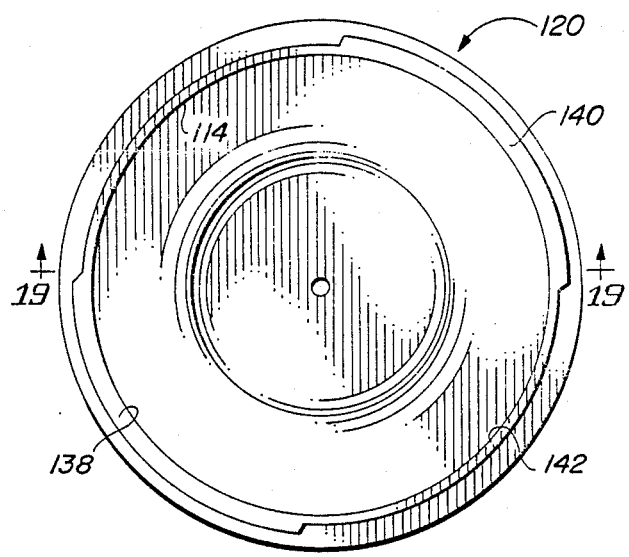
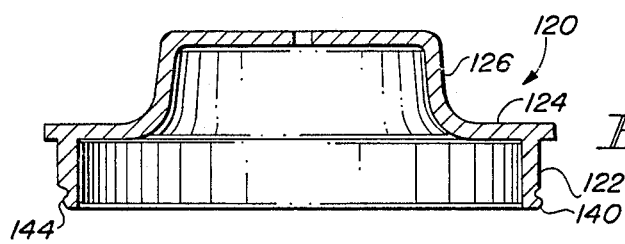
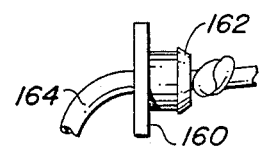
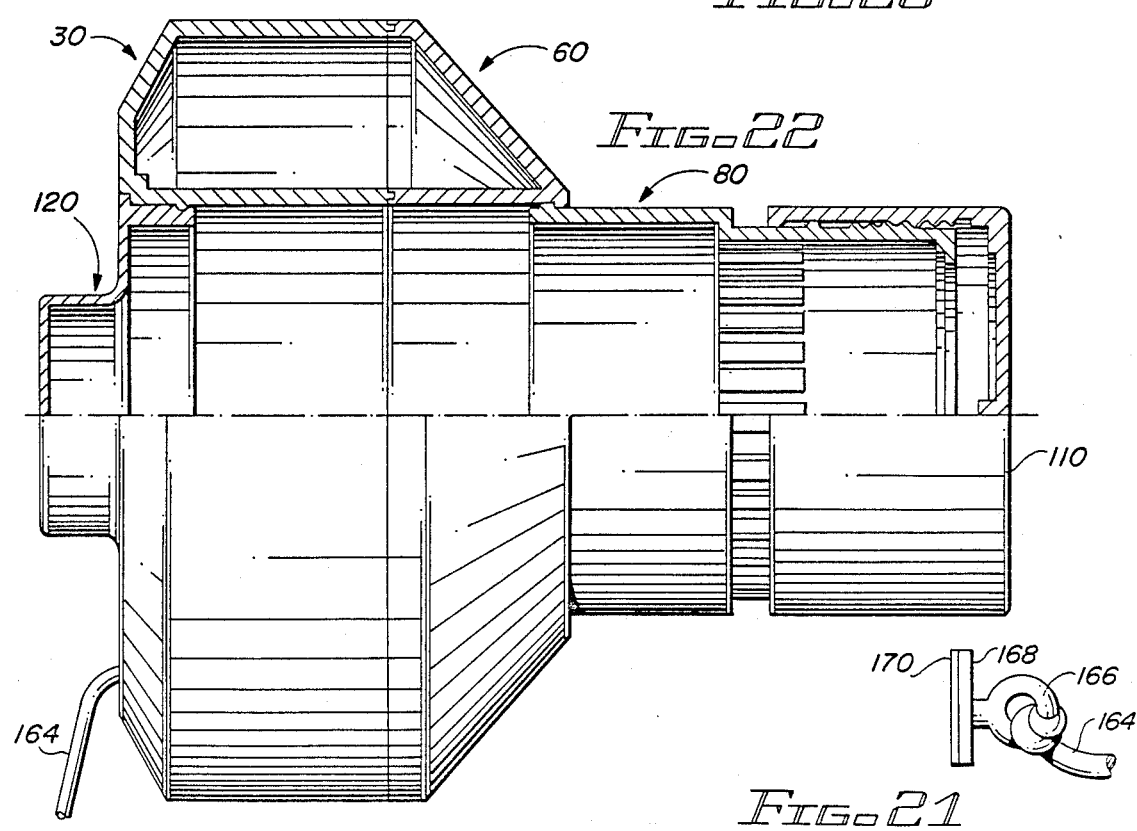

SWIMMING POOL CHEMICAL DISPENSER AND METHOD OF MAKING SAME

IDENTIFICATION OF RELATED APPLICATIONS

The device which includes the present invention is also the subject of four additional concurrently filed applications for letters patent, which are all assigned to the assignee of the present invention. The four additional applications are U.S. Ser. No. 104,287, entitled "Metering Mechanism for a Swimming Pool Chemical Dispenser," U.S. Ser. No. 104,291, entitled "Childproof Top for a Swimming Pool Chemical Dispenser," U.S. Ser. No. 104,290, entitled "Chemical Depletion Signal for a Swimming Pool Chemical Dispenser," and U.S. Ser. No. 104,402, entitled "Swimming Pool Chemical Dispenser With Restraining Tether." The additional four applications are hereby incorporated herein by reference.

BACKGROUND OF THE INVENTION

Field of the Invention

The present invention relates generally to devices for dispensing chemicals into swimming pools to maintain the quality and clarity of water therein, and more particularly to a floating dispenser of novel construction for containing solid chemical pellets or tablets therein which are dispensed essentially continuously by nature of dissolution of the solid pellets or tablets by water flowing through the floating dispenser.

Untreated water in both above-ground and below-ground swimming pools tends to deteriorate relatively rapidly due to the growth of bacteria and other organic matter such as algae which result in untreated water quickly becoming both unsanitary and unclear. When the pool water remains untreated for several days, it represents a health hazard to swimmers, and a cleanup problem due to the growth of algae on the surface of the pool.

Water soluble chemicals are added to the pool water to kill the bacteria and to retard the growth of algae. Typically, chlorine is the chemical used to maintain water quality, with the periodic administration of a dose of a liquid solution containing chlorine being the most commonly used treatment. This has some disadvantages, mainly in that a large dosage of chlorine is periodically released, as for example in a daily administration of the liquid treatment to the swimming pool. The chlorine level of the water in the pool will therefore vary considerably during the course of even one day, with the chlorine concentration being higher than desirable immediately after the administration of liquid chlorine, and lower than desirable after the chlorine has partially dissipated over a period of time. This diminution of chlorine concentration may vary considerably due to the size and temperature of the pool, the weather, and the amount of use the pool is experiencing as well as other factors.

It is apparent to those knowledgeable in the art that it is instead desirable to maintain the chlorine level at a more or less constant concentration by dispensing the chlorine more frequently, which is impractical in most cases, or by using a specially designed device to dispense the chlorine continuously at a rate designed to maintain a desired concentration in the pool. An early example of such a device is shown in U.S. Pat. No. 3,202,322, to Cleary et al., which teaches a floating dispenser of liquid chemicals which uses a wick to control the rate of propagation of the liquid chemicals into the water of a pool or other body of water. The Cleary et al. device will dispense the liquid into the water continuously, but it is quite difficult to adjust the rate at which the liquid is dispensed. In fact, the removal and replacement of the wick or other components with different sizes of wicks or other components is required to adjust the flow rate of the device.

It is thusly apparent that an important requirement for a chemical dispenser for a swimming pool is its ability to be easily and conveniently adjusted to provide a variable rate of dispersion of the chemicals into the pool to accommodate different pool sizes and other factors influencing the amount of chemicals necessary to be dispensed. A second factor has been found to be the physical nature of the chemical dispensed. While the Cleary et al. device dispenses liquid chemicals, for most people the preferred type of chemicals are the solid chemical pellets or tablets which are more convenient to use than are liquid chemicals.

The chemicals which are currently most widely used in swimming pools for either continuous or daily treatment are the trichloroisocyanurates, which are generally referred to as trichlor. In tablet form trichloroisocyanurates may last as long as one to two weeks, and they leave no residue after dissolving. Although they have the advantage of leaving no residue, they dissolve relatively quickly and therefore only tablets may be used, since pellets would not last for even a week.

Another type of solid pool disinfectant chemical in use is calcium hypochlorite, which is relatively inexpensive and convenient to use. Calcium hypochlorite tablets last for an extended length of time, such as for example two weeks or more in a floating or skimmer feeder. The disadvantage of calcium hypochlorite pellets is that they leave a residue in the floating feeder or on the bottom of the pool after dissolving. Calcium hypochlorite is used mainly for infrequent shock treatments for this reason.

Examples of skimmer feeders are shown in U.S. Pat. No. 4,546,503, to Casberg, and in U.S. Pat. No. 4,643,881, to Alexander et al. Such feeders are used in forced circulation flow pool systems having a skimmer basket at the location at which water is removed from the pool. The feeder has solid chemical tablets or pellets (referred to hereafter generically as "chlorine tablets") placed inside, and the feeder is placed in the skimmer basket. Chlorine is added to the water as it is drawn out of the pool for filtering and heating. Skimmer feeders are frequently used in large and frequently used pools, such as for example in hotel pools.

Floating feeders are buoyant devices, generally molded of plastic and designed for carrying solid tablets or pellets below the water surface while the device is floating. By either varying the area through which water may flow through the feeder, or by varying the amount of chlorine tablets placed in the feeder, or both, the flow rate of chlorine into the pool water is controlled. The area through which water may flow is usually set by adjusting the area of apertures in the lower sides of the floating feeders. Floating feeders are relatively inexpensive and easy to use, and as such have found particular favor in the home pool market.

Floating feeders currently in use are remarkably effective devices, but they do have one major disadvantage. The feeders are made of molded plastic segments with complex shapes, typically requiring expensive and large size molds to manufacture them. In addition, the more ambitious floating feeders (those capable of performing their intended function relatively well and with an acceptable degree of precision) typically are made of several segments, which may have to be glued or otherwise attached together. These designs require a considerable initial investment in molds, in manufacturing equipment, and in labor to assemble them, with a corresponding increase in costs which must be passed on to the consumer. When faced with a choice between inexpensive (and less effective) floating feeders and the more expensive (and more effective) feeders, many consumers will make their choice on the basis of price.

Another disadvantage encountered in many currently available feeders is the relative rotation between adjacent parts. This is undesirable for two reasons: first, a device allowing relative rotation is in most cases secured together by a single rotatable joint such as a screw or rivet; secondly, relative movement between adjacent parts may allow the aperture adjustment to be disturbed when the feeder is bumped. This is one of the main disadvantages of inexpensive feeders.

Accordingly, it is the primary objective of the present invention to present a floating feeder which is both effective and easily and inexpensively manufactured. In the construction of the feeder, all complex forms are to be avoided so as to require only simple and inexpensive molds in the manufacture of the device. In addition, it is an objective of the present invention to use the absolute minimum of adhesive operations; instead to the greatest extent possible the improved feeder should use snap-together operation.

While attaining these objectives, no loss in strength or durability is acceptable. The improved feeder should have excellent strength and durability characteristics to ensure a long life. It is an objective of the present invention to prevent rotation of the relative parts to the extent possible. This prevents both flimsy designs susceptible to easily breaking, and accidental readjustment of the feeder apertures. Finally, the aforesaid advantages and objectives must all be attained while incurring no relative disadvantage.

SUMMARY OF THE INVENTION

The disadvantages and limitations of the background art discussed above are overcome by the present invention. With this invention, a floating feeder incorporating five main molded segments is taught which may be manufactured without using complex and expensive molds and equipment. With only a single exception, the feeder of the present invention is assembled by snapping the parts together. That single exception is the float portion of the feeder, which must be a watertight compartment to ensure that the device will float.

The float assembly is manufactured in two segments—a top half and a bottom half. The two halves of the float are configured to allow them to be attached together to form a watertight assembly using either adhesive joints as in the preferred embodiment, or by using an ultrasonic device to seal the joints. This is the only instance in the design of the present invention in which a gluing operation is necessary, with the rest of the assembly being accomplished by snapping the various components together.

Mounted below the float assembly is the metering valve assembly, which is made up of two components—a metering valve body and a metering valve cap. The metering valve body is attached to the bottom of the float assembly by inserting the top of the metering valve into the bottom of the float assembly. A tapered snap fit ensures that the top of the metering valve body will enter bottom of the float assembly relatively easily, and once inserted will be difficult to remove. The configuration of the metering valve body and the valve assembly also utilizes means to prevent the relative rotational movement between the two components.

The metering valve body has disposed on the lower portions of the sides thereof a plurality of apertures through which water may flow to contact chlorine tablets which will be placed in the device. The metering valve cap fits over the metering valve body, and fulfills two functions. First, the metering valve cap seals the bottom of the metering valve assembly, so that chlorine tablets placed in the device will rest on the bottom of the metering valve assembly. Secondly, the metering valve cap may be moved longitudinally on the metering valve body to selectively open or close the apertures in the metering valve body to the degree desired. Once adjusted, relative movement between the metering valve cap and the metering valve body is inhibited. The configuration of the metering assembly is the subject of the above-referenced copending patent application entitled "Metering Mechanism for a Swimming Pool Chemical Dispenser."

The float has an aperture in the top thereof through which chlorine tablets may be placed in the device. The aperture is sealed with a float cap which mounts into the aperture to seal it from the top side. Relative movement between the float cap and the float assembly is also inhibited by the interlocking design of the float cap and the float assembly, which is the subject of the above-identified copending patent application entitled "Childproof Top for a Swimming Pool Chemical Dispenser."

It will therefore be appreciated that the present invention teaches a floating feeder which is both highly effective an easily and inexpensively manufactured. All complex forms are avoided in the manufacturing of the feeder, thereby requiring only simple and inexpensive molds in the manufacture of the device. The present invention uses only a single adhesive operations to seal the float assembly, instead using snap-together assembly to the greatest extent possible.

The present invention prevents rotation of the relative parts thereby preventing both flimsy designs susceptible to breakage and accidental readjustment of the feeder metering apertures. The improved floating dispenser has excellent strength and durability characteristics to ensure a long life. All of the aforesaid advantages and objectives are attained while incurring no relative disadvantage whatsoever.

DESCRIPTION OF THE DRAWINGS

These and other advantages of the present invention are best understood with reference to the drawings, in which:

FIG. 15 is a sectional view of the metering valve cap shown in FIG. 14, showing the threads on the inside of the lower portion of the metering valve cap;

FIG. 17 is a plan view from the top side of the float cap used to close the aperture in the top of the float top FIG. 18 is a plan view from the bottom of the float cap shown in FIG. 17, illustrating the location of the narrow and wide beads on the bottom of the float cap which are for engagement of the narrow and wide beads in the float top;

FIG. 19 is a sectional view of the float cap shown in FIGS. 17 and 18, showing the portion used to grip the float cap;

FIG. 20 is a view from the side of the cord retainer used to retain one end of the tethering cord to the float top;

FIG. 21 is a view from the side of the retainer hook used to retain the other end of the tethering cord to the side of a swimming pool; and FIG. 22 is a side view of the assembled floating dispenser of the present invention partially cut away to show details of assembly.

DETAILED DESCRIPTION OF THE PREFERRED EMBODIMENT

Figure 1:
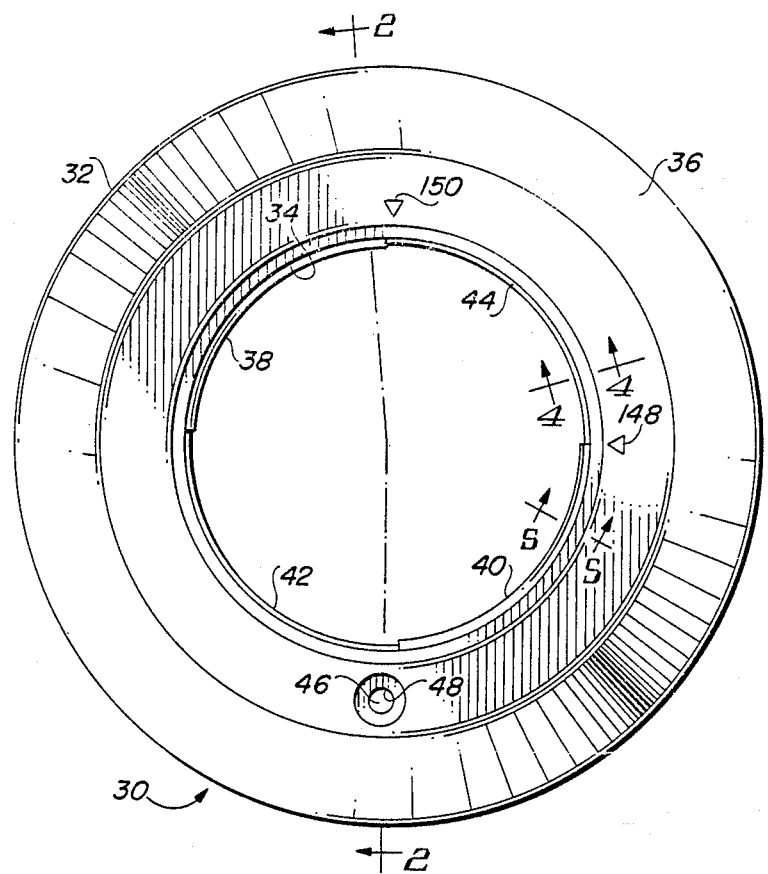
FIG. 1 is a plan view from the top side of the float top of the present invention illustrating the narrow and wide beads used to retain the float cap, and also showing the cord retainer recess.
Figure 2:
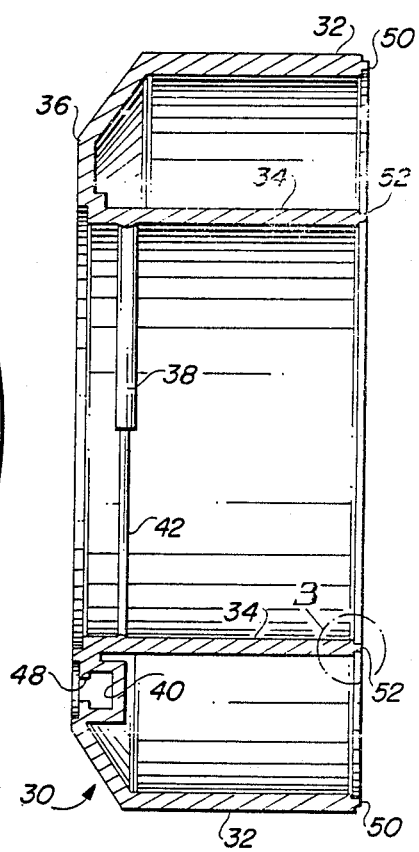
FIG. 2 is a sectional view of the float top of FIG. 1 illustrating the float top inner and outer cylinders used to form the top half of a sealed float compartment, and also showing the cord retainer recess.

The preferred embodiment of the present invention uses a number of parts, the construction of which parts will be discussed first before discussing the operation of the device. The float assembly is made of two parts, the first of which is a float top 30 which is shown in FIGS. 1 and 2. The float top 30 forms the top half of a sealed area which will be used to provide buoyancy to the feeder. This top half of the sealed area is located between a float top outer cylinder 32 and a float top inner cylinder 34. The tops of the float top outer cylinder 32 and the float top inner cylinder 34 are both sealingly connected to a the top surface 36 extending therebetween, which top surface 36 is shown in the figures to be flat adjacent the float top inner cylinder 34 and angled slightly for aesthetic effect near the float top outer cylinder 32.

It will be perceived that the area inside the float top inner cylinder 34 is open, both at the top and at the bottom thereof. Located circumferentially around the inside surface of the float top inner cylinder 34 at a location near to the top of the float top inner cylinder 34 are an end-to-end series of four raised beads. Two of the beads are wide beads 38 and 40, and two of the beads are narrow beads 42 and 44. The wide bead 38 is located intermediate the narrow bead 42 and the narrow bead 44, the narrow bead 42 is located intermediate the wide bead 38 and the wide bead 40, the wide bead 40 is located intermediate the narrow bead 42 and the narrow bead 44, and the narrow bead 44 is located intermediate the wide bead 40 and the wide bead 38.

Figure 4:
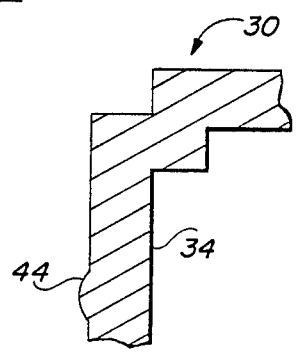
FIG. 4 is an enlarged cutaway view of a portion of the float top shown in FIG. 1 showing one of the narrow beads located inside the float top inner cylinder and near to the top side thereof.
Figure 5:
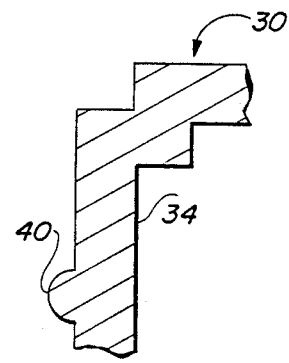
FIG. 5 is an enlarged cutaway view of a portion of the float top shown in FIG. 1 showing one of the wide beads located inside the float top inner cylinder and near to the top side thereof.

The narrow bead 44 is shown in cross-section in FIG. 4, and the wide bead 40 is shown in cross-section in FIG. 5. The wide bead 38 is identical to the wide bead 40, and the narrow bead 42 is identical to the narrow bead 44. The wide beads 38 and 40 have the same height in cross section as the narrow beads 42 and 44, but the wide beads 38 and 40 project further inwardly from the float top inner cylinder 34 than do the narrow beads 42 and 44. In the preferred embodiment, the wide beads 38 and 40 project inwardly from the float top inner cylinder 34 approximately four times as far as do the narrow beads 42 and 44. As a matter of practicality, the wide beads 38 and 40 should project inwardly at least twice as far as do the wide beads 40 and 42.

Each of the narrow beads 42 and 44 extend around the interior of the float top inner cylinder 34 for slightly more than ninety degrees, and each of the wide beads 38 and 40 extend around the float top inner cylinder 34 for slightly less than ninety degrees. In the preferred embodiment, for example, each of the narrow beads 42 and 44 extend around the interior of the float top inner cylinder 34 for ninety-three degrees, and each of the wide beads 38 and 40 extend around the float top inner cylinder 34 for eighty-seven degrees. The reasons for this configuration will become evident later in conjunction with the discussion of the assembly and operation of the device.

Disposed in the top surface 36 of the float top 30 is a cord retainer recess 46. The cord retainer recess 46 has disposed below the plane of the top surface 36 a reduced diameter shoulder 48, and but for the presence of the reduced diameter shoulder 48 the cord retainer recess 46 would be an essentially cylindrical recess with the bottom sealed. That the bottom of the cord retainer recess 46 is sealed is essential to the watertight construction of the float assembly, of which the top half is formed between the float top outer cylinder 32 and the float top inner cylinder 34, and under the top surface 36.

The bottom edge of the float top outer cylinder 32 has extending downwardly therefrom an essentially cylindrical tongue 50 narrower than the thickness of the float top outer cylinder 32. Likewise, the bottom edge of the float top inner cylinder 34 has extending downwardly therefrom an essentially cylindrical tongue 52 narrower than the thickness of the float top inner cylinder 34. The cylindrical tongue 52 is shown in detail in FIG. 3, and the cylindrical tongue 50 is identical in cross-sectional configuration to the cylindrical tongue 52. In the preferred embodiment the cylindrical tongues 50 and 52 are slightly tapered approaching the bottoms thereof.

The cylindrical tongue 52 has extending downwardly therefrom a raised bead 54, which is small compared to the width of the cylindrical tongue 52. Similarly, the cylindrical tongue 50 also has a raised bead 56 (not shown), which is small compared to the width of the cylindrical tongue 50. The purposes of the cylindrical tongues 50 and 52 and the raised beads 54 and 56 will become evident later in conjunction with the discussion of the assembly of the float assembly.

Figure 6:
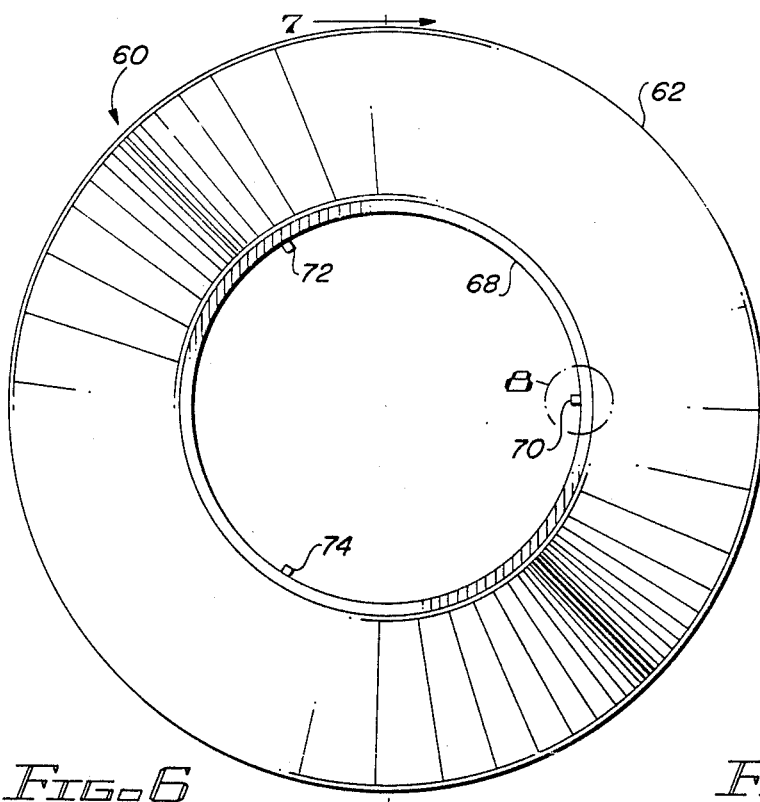
FIG. 6 is a plan view from the bottom side of the float bottom of the present invention showing the shoulder and three tabs used to secure the metering valve body to the float assembly.
Figure 7:
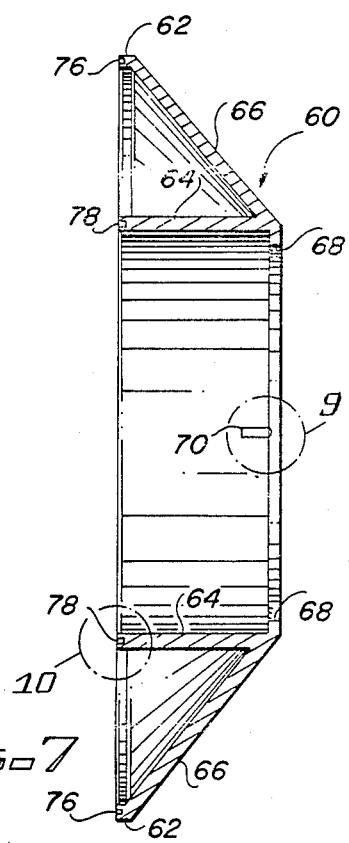
FIG. 7 is a sectional view of the float bottom shown in FIG. 1 illustrating the float bottom inner and outer cylinders used to form the bottom half of the sealed float compartment, and also showing the shoulder and one of the tabs used to secure the metering valve body.

Moving now to FIGS. 6 and 7, a float bottom 60 is illustrated which will form the bottom half of the float assembly. As such the float bottom 60 forms the bottom half of the sealed area which will be used to provide buoyancy to the feeder. This bottom half of the sealed area is located between a short float bottom outer cylinder 62 and a longer float bottom inner cylinder 64. The top of the float bottom outer cylinder 62 and the top of the float bottom inner cylinder 64 extend to the same height, with the bottom of the float bottom inner cylinder 64 extending downward further than does the bottom of the float bottom outer cylinder 62. The bottoms of the float bottom outer cylinder 62 and the float bottom inner cylinder 64 are both sealingly connected to an angled bottom surface 66 extending therebetween.

Figure 8:
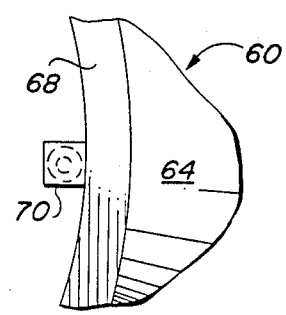
FIG. 8 is an enlarged view of a portion of the float bottom as shown in FIG. 6, showing a portion of the shoulder and one of the tabs used to secure the metering valve body.
Figure 9:
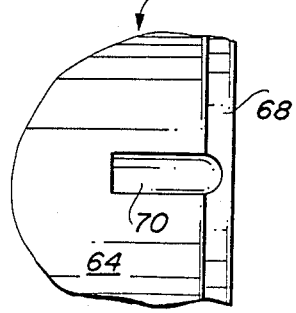
FIG. 9 is an enlarged view of a portion of the float bottom as shown in FIG. 7, showing a portion of the shoulder and one of the tabs used to secure the metering valve body.

A shoulder 68 protrudes slightly inwardly from the float bottom inner cylinder 64 at the bottom side thereof. It will be perceived that the area inside the float bottom inner cylinder 64 is open at the top thereof, and inside the shoulder 68 at the bottom thereof. Located near to the bottom of the float bottom inner cylinder 64 are three tabs 70, 72, and 74 which are located at one-hundred-twenty degree increments around the inner circumference of the float bottom inner cylinder 6 and the shoulder 68. The tab 70 is shown in FIG. 8 to present an essentially square cross-section inside the inner diameter of the shoulder 68, and to have a rounded surface at the bottom end of the tab 70 near to the bottom edge of the float bottom 60 as shown in FIG. 9. The tabs 72 and 74 are identical in configuration to the tab 70.

The top edge of the float bottom outer cylinder 6 has located therein a cylindrical groove 76 which is narrower than the thickness of the float bottom outer cylinder 62. Likewise, the top edge of the float bottom inner cylinder 64 has located therein a cylindrical groove 78 which is narrower than the thickness of the float bottom inner cylinder 64. The cylindrical groove 78 is shown in detail in FIG. 10, and the cylindrical groove 76 is identical in cross-sectional configuration to the cylindrical groove 78. In the preferred embodiments, the cylindrical grooves 76 and 78 are tapered slightly approaching the bottoms of the cylindrical grooves 76 and 78.

Figure 3:
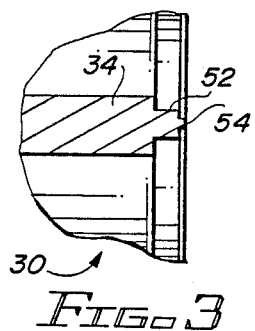
FIG. 3 is an enlarged portion of the sectional view of the float top in FIG. 2 showing the tongue located on the bottom side of the float top inner cylinder.
Figure 10:
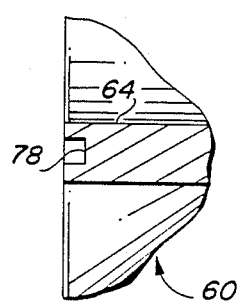
FIG. 10 an enlarged portion of the sectional view of the float bottom in FIG. 7, showing the groove located on the top side of the float bottom inner cylinder.

The assembly of the float assembly from the float top 30 and the float bottom 60 may now be discussed, with primary reference to FIGS. 1, 2, 6, and 7, and secondary reference to FIGS. 3 and 10. The bottom of the float top 30 is designed to mate with the top of the float bottom 60, with the cylindrical tongue 50 of the float top outer cylinder 32 fitting into the cylindrical groove 76 of the float bottom outer cylinder 62, and the cylindrical tongue 52 of the float top inner cylinder 34 fitting into the cylindrical groove 78 of the float bottom inner cylinder 64. The raised beads 56 and 54 serve to keep the cylindrical tongues 50 and 52, respectively, slightly raised from the bottoms of the cylindrical grooves 76 and 78, respectively.

In the preferred embodiment the cylindrical tongues 50 and 52 fit into the cylindrical grooves 76 and 78, respectively, with a slight clearance on all sides. A waterproof adhesive (not shown) may be installed into the cylindrical grooves 76 and 78, and the cylindrical tongues 50 and 52 may then be inserted into the cylindrical grooves 76 and 78, respectively. The slight clearance allows the waterproof adhesive to adhere to all sides of the cylindrical tongues 50 and 52 and the cylindrical grooves 76 and 78, thereby forming bonds of the maximum possible strength between the cylindrical tongue 50 and the cylindrical groove 76, and between the cylindrical tongue 52 and the cylindrical groove 78.

The float assembly consisting of the float top 30 and the float bottom 60 will appear as shown in FIG. 22, and will contain a completely watertight compartment therein. It will be appreciated by those skilled in the art that it is necessary to use a bonding operation between the float top 30 and the float bottom 60 in order to obtain an absolutely watertight compartment. The bonding operation could also be performed by other techniques, such as the use of ultrasonic welding to achieve the desired watertight float assembly.

It will also be appreciated by those skilled in the art that the lengths of the float top outer cylinder 32 and the float top inner cylinder 34 in the float top 30 and the lengths of the float bottom outer cylinder 62 and the float bottom inner cylinder 64 in the float bottom 60 may be varied to vary the size of the watertight compartment. Similarly, the distance between the float top outer cylinder 32 and the float top inner cylinder 34 in the float top 30 and between the float bottom outer cylinder 62 and the float bottom inner cylinder 64 in the float bottom 60 may also be varied to vary the size of the watertight compartment.

It should also be noted that the lengths of the float top outer cylinder 32 and 34 in the float top 30 may be increased by a given amount while simultaneously decreasing the lengths of the float bottom outer cylinder 62 and the float bottom inner cylinder 64 in 60 by the same amount, with no effect on the size of the watertight compartment or the operation of the device. By the same token, the lengths of the float bottom outer cylinder 62 and 64 in the float bottom 60 may both be increased by a given amount while simultaneously decreasing the lengths of both the float top outer cylinder 32 and the float top inner cylinder 34 in the float top 30 by the same amount, with no effect on the size of the watertight compartment. The net effect of either of these changes will be the lowering or raising of the joint between the float top 30 and the float bottom 60 in the float assembly, a key design requirement for the above-identified copending patent application entitled "Chemical Depletion Signal for a Swimming Pool Chemical Dispenser."

Figure 11:
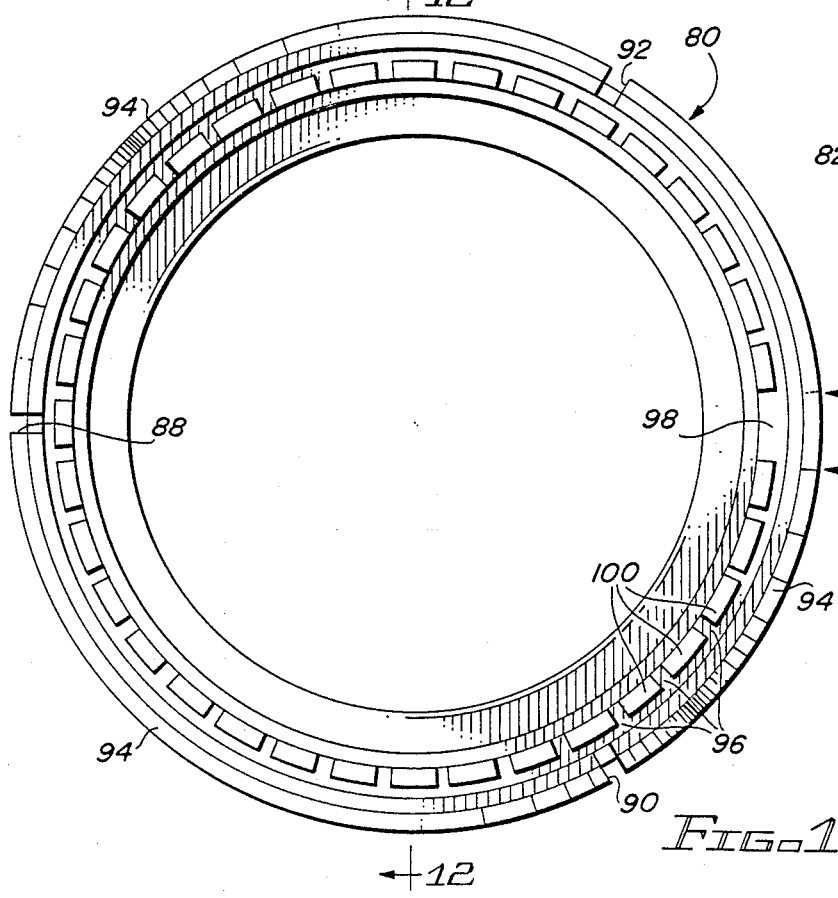
FIG. 11 is plan view from the top of the metering valve body of the present invention showing the three notches for placement around the three tabs on the float bottom of FIG. 6, and also showing from the top the configuration of the metering valve ribs and the apertures formed therebetween.
Figure 12:
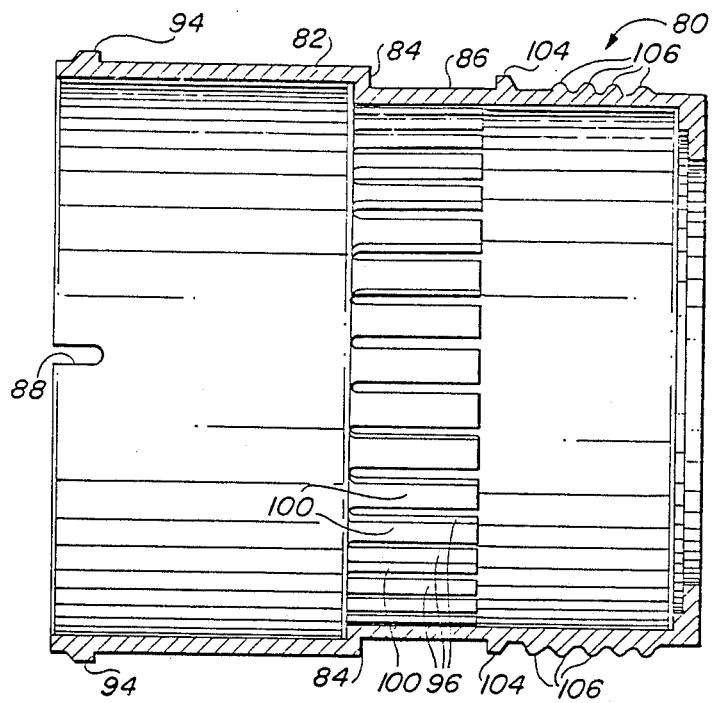
FIG. 12 is a sectional view of the metering valve body shown in FIG. 11, showing the configuration of the metering valve ribs and the apertures formed therebetween, the shoulder used to retain the metering valve cap on the metering valve body, and the threads on the outside of the lower portion of the metering valve body lower cylinder.
Figure 13:
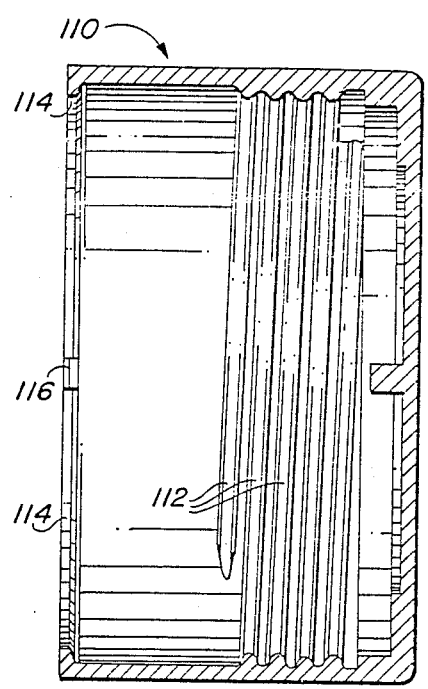

FIGS. 11 and 12 illustrate a metering valve body 80 which is to be attached to the bottom side of the float bottom 60. The metering valve body 80 is essentially comprised of two cylindrical segments, one mounted on top of the other. The top of the metering valve body 80 is comprised of a metering valve body top cylinder 82. Located at the bottom of the metering valve body top cylinder 82 is a shoulder 84 connecting the bottom of the metering valve body top cylinder 82 to the top of a metering valve body bottom cylinder 86 having a smaller outer diameter than the outer diameter of the metering valve body top cylinder 82. In the preferred embodiment the outer diameter of the metering valve body bottom cylinder 86 is slightly less than the inner diameter of the metering valve body top cylinder 82, for reasons which will become apparent in conjunction with the discussion of the metering valve cap below.

The metering valve body top cylinder 82 has three notches 88, 90, and 92 in the top thereof, which notches 88, 90, and 92 are located one-hundred-twenty degrees apart around the top edge of the metering valve body top cylinder 82. The three notches 88, 90, and 92 extend longitudinally from the top edge of the metering valve body top cylinder 82 downward, and are configured to accept the three tabs 70, 72, and 74 when the top of the metering valve body top cylinder 82 is inserted into the bottom of the float bottom 60.

The outer diameter of the metering valve body top cylinder 82 is sized to allow the top portion of the metering valve body top cylinder 82 to be inserted into the bottom of the float bottom 60; therefore, the outer diameter of 82 is slightly less than the inner diameter of the shoulder 68 on the bottom of the float bottom 60. Located just below and extending around the top edge of the metering valve body top cylinder 82 on the outside thereof (except at the locations of the three notches 88, 90, and 92) is a tapered shoulder 94.

The tapered shoulder 94 is tapered on the top side to allow the top of the metering valve body top cylinder 82 to be forcibly inserted into the inner diameter of the shoulder 68 with the three notches 88, 90, and 92 in the metering valve body top cylinder 82 being lined up with the three tabs 70, 72, and 74 on the inside of the float top inner cylinder 34 (FIG. 6). The top of the metering valve body top cylinder 82 ma be inserted into the bottom of the float bottom 60 until the three tabs 70, 72, and 74 are fully inserted into the three notches 88, 90, and 92, at which point the metering valve body 80 is fully assembled to the float bottom 60.

As the top of the metering valve body top cylinder 82 is inserted into the bottom of the float bottom 60, the tapered shoulder 94 is forced past the shoulder 68 in thebottom of the float bottom 60. The taper in the tapered shoulder 94 allows it to move with some resistance past the shoulder 68 as the top of the metering valve body top cylinder 82 is inserted into the bottom of the float bottom 60. Immediately prior to the tabs 70, 72, and 74 being fully inserted into the notches 88, 90, and 92, the bottom edge of the tapered shoulder 94 will slip past the upper edge of the shoulder 68, locking the metering valve body 80 to the float bottom 60. It will be appreciated by those skilled in the art that it will be quite difficult to remove the metering valve body 80 from the float bottom 60 once they are assembled together, thereby assuring a strong assembly between the float assembly and the metering valve assembly. Additionally, the cooperating tabs 70, 72, and 74 and notches 88, 90, and 92 prevent rotational movement between the float assembly and the metering valve assembly.

The metering valve body bottom cylinder 86 is attached to the metering valve body top cylinder 82 at the shoulder 84, as stated previously. Referring to FIGS. 11 and 12, it will be noted that the top portion of the metering valve body bottom cylinder 86 is comprised of a plurality of longitudinally extending thin metering valve ribs 96 and a single metering valve wide rib 98 having therebetween a plurality of apertures 100. In the preferred embodiment there are thirty-four thin metering valve ribs 96 and the single wide metering valve rib 98 evenly spaced around the circumference of the top portion of the metering valve body bottom cylinder 86. The apertures 100 together represent the maximum flow area through the valve metering assembly.

Figure 13:
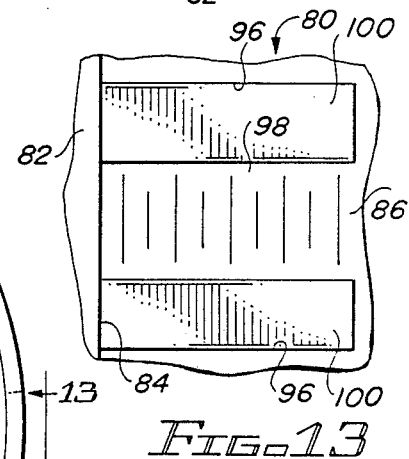
FIG. 13 is an enlarged view from the side of the metering valve wide rib containing the position markings used to indicate the degree to which the apertures located between the metering valve ribs are opened or closed by the metering valve cap.

Referring now to FIG. 13, details which are molded into the wide metering valve rib 98 on the outer surface thereof are shown. These details are position markings 102, which position markings 102 comprise a plurality of segments of laterally extending lines evenly spaced from top to bottom on the wide metering valve rib 98. In the preferred embodiment, alternate ones of the position markings 102 are either longer or shorter than adjacent ones of the position markings 102. The position markings 102 will be used to indicate the degree to which the apertures 100 are open or closed.

Located around the outer circumference of the metering valve body bottom cylinder 86 below the thin metering valve ribs 96 and the wide metering valve rib 98 is a shoulder 104. Also located around the outer circumference of the metering valve body bottom cylinder 86 and between the shoulder 102 and the bottom of the metering valve body bottom cylinder 86 are threads 106. In the preferred embodiment there are approximately four revolutions of threads 106 to provide a fine degree of adjustment for the valve metering mechanism. The function of the shoulder 104 and the threads 106 will become apparent below in conjunction with the discussion of the adjustment of the metering valve assembly.

Figure 14:
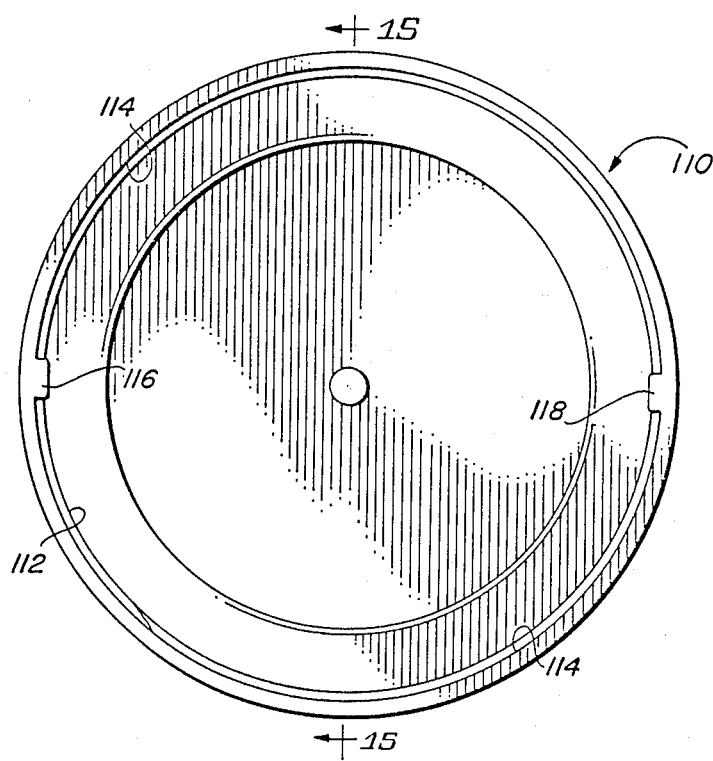
FIG. 14 is a plan view from the top side of the metering valve cap showing the location of the two tabs used to prevent inadvertent relative movement between the metering valve cap and the metering valve body.

Referring now to FIGS. 14 and 15, the second half of the metering valve may be described. A metering valve cap 110 which is essentially cylindrical has its top end open and its bottom end closed. The inside diameter of the metering valve cap 110 is sufficiently larger than the outside diameter of the metering valve body bottom cylinder 86 and the threads 106 thereon to allow the metering valve cap 110 to fit over the outside of the metering valve body bottom cylinder 86. In the preferred embodiment, the outside diameters of the metering valve body top cylinder 82 and the metering valve cap 110 are identical.

The length (or depth) of the metering valve cap 110 is sufficient to allow the top edge of the metering valve cap 110 to fit over the metering valve body bottom cylinder 86 against the underside of the shoulder 84 on the metering valve body 80, completely covering the apertures 10 in the metering valve body 80 In the preferred embodiment, the depth of the metering valve cap 110 is just sufficient to allow the metering valve cap 110 to fit over the metering valve body bottom cylinder 86 to the shoulder 84.

On the lower portion of the inside diameter of the metering valve cap 110 are threads 112 corresponding in pitch, size, and number of revolutions to the threads 106 on the outside of the lower portion of the metering valve body bottom cylinder 86. It will be apparent that when the metering valve cap 110 is inserted approximately half way onto the metering valve body bottom cylinder 86, the threads 112 in the metering valve cap 110 and the threads 106 on the metering valve body bottom cylinder 86 will engage to allow the metering valve cap 110 to be screwed to bring the metering valve cap 110 the rest of the way over the metering valve body bottom cylinder 86.

At the point at which the threads 112 are first engaged with the threads 106, the top of the metering valve cap 110 is just below the apertures 100. As the metering valve cap 110 is turned with respect to the metering valve body 80, the top of the metering valve cap 110 gradually closes the apertures 100. The apertures 100 are completely closed when the top of the metering valve cap 110 contacts the underside of the shoulder 84 on the metering valve body 80.

Located at the top of the metering valve cap 110 is a shoulder 114 extending around the circumference of the inside diameter of the metering valve cap 110. The shoulder 114 has a smaller inside diameter than the outside diameter of the shoulder 104 on the metering valve body bottom cylinder 86, and thus presents an interference fit for the metering valve cap 110 as it is inserted onto the metering valve body bottom cylinder 86. The shoulder 114 in the metering valve cap 110 must be forced past the shoulder 104 on the metering valve body bottom cylinder 86 before the threads 112 in the metering valve cap 110 will contact the threads 106 on the metering valve body bottom cylinder 86. The inside diameter of the shoulder 114 is sufficiently larger than the outside diameter of the metering valve body bottom cylinder 86 to allow the shoulder 114 to move freely past the thin metering valve ribs 96 and the wide metering valve rib 98.

It may therefore be appreciated that the interference fit between the shoulder 114 and the shoulder 104 will act to retain the metering valve cap 110 on the metering valve body 80. Even when the metering valve cap 110 is fully unscrewed from the metering valve body bottom cylinder 86, the shoulder 114 in the metering valve cap 110 will prevent the metering valve cap 110 from slipping by the shoulder 104 on the metering valve body bottom cylinder 86, thereby preventing the metering valve cap 110 from falling off of the metering valve body 80.

When the shoulder 114 in the metering valve cap 110 contacts the shoulder 104 on the metering valve body bottom cylinder 86, the metering valve cap 110 is nearly unscrewed (or fully unscrewed) from the metering valve body bottom cylinder 86, and the apertures 100 are fully open. In addition to preventing the metering valve cap 110 from falling off of the metering valve body 80 and into the pool, this design has at least one other desirable advantage. Since there are likely to be chlorine tablets (not shown) in the bottom of the metering valve cap 110, this feature will prevent the chlorine tablets from being inadvertently dumped in the pool when the metering valve cap 110 is fully unscrewed from the metering valve body bottom cylinder 86.

Figure 16:
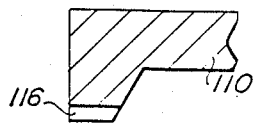
FIG. 16 is an enlarged cutaway view of a portion of the metering valve cap of FIG. 15, showing the configuration of one of the two tabs used to prevent inadvertent relative movement between the metering valve cap and the metering valve body.

Completing the construction of the metering valve cap 110 are two tabs 116 and 118 which are located at the top of the metering valve cap 110 and which project inwardly. The tabs 116 and 118 are spaced one-hundred-eighty degrees apart, as best shown in FIG. 14. One of the tabs 116 is also shown in a cross-sectional view in FIG. 16, which demonstrates that the tabs 116 and 118 project inwardly somewhat further than does the shoulder 114. The tabs 116 and 118 project further inwardly than the radius of the outer diameter of the metering valve body bottom cylinder 86, particularly the portion of the metering valve body bottom cylinder 86 comprising the thin metering valve ribs 96 and the wide metering valve rib 98.

This will necessitate forcing the tabs 116 and 118 as well as the shoulder 114 of the metering valve cap 110 over the threads 106 and the shoulder 104 on the metering valve body bottom cylinder 86 during installation of the metering valve cap 110 onto the metering valve body 80. Once installed, the tabs 116 and 118 perform the valuable function of maintaining the metering valve cap 110 in the desired position on the metering valve body 80. The tabs 116 and 118 are of a width allowing them to fit into the apertures 100 between the thin metering valve ribs 96 and the wide metering valve rib 98 on the metering valve body bottom cylinder 86. Once the metering valve cap 110 has been turned to open or close the apertures 100 to the desired degree, the tabs 116 and 118 will maintain that adjustment indefinitely.

It should be noted that only a slight amount of interference fit is necessary for the tabs 116 and 118 to allow them to maintain the desired setting of the metering valve cap 110 on the metering valve body 80. Therefore, the metering valve cap 110 may be turned on the metering valve body 80 without exerting an undue amount of force. In the preferred embodiment, the tabs 116 and 118 are rounded slightly around the edges to enhance the ease of adjustment of the metering valve cap 110 on the metering valve body 80.

Referring now to FIGS. 17–19, the last of the five major components of the floating feeder is shown. A float cap 120 for installation on the top side of the float top 30 shown in FIGS. 1 and 2 is shown. The float cap 120 has a cylindrical portion 122 on the bottom side, which cylindrical portion 122 has a smaller outer diameter than the inner diameter of the float top inner cylinder 34 to allow the cylindrical portion 122 of the float cap 120 to fit inside the float top inner cylinder 34. The float cap 120 also has a circular flat portion 124 above and projecting outward slightly from the top of the cylindrical portion 122 to prevent the float cap 120 from fitting entirely into the float top inner cylinder 34. Accordingly, the outer diameter of the circular flat portion 124 is greater than the inner diameter of the float top inner cylinder 34 to allow the float cap 120 to be placed on the top of the float top 30.

The float cap 120 also has a grip portion 126 extending above the circular flat portion 124 and the cylindrical portion 122, to allow the float cap 120 to be gripped securely for installation or for removal. In the preferred embodiment, the grip portion 126 is merely a cylindrical segment of a reduced diameter fitting conveniently into the hand of the user of the device. Completing the discussion of the components making up the float cap 120 are an end-to-end series of four raised beads located circumferentially around the outside surface of the cylindrical portion 122 at a location near to the bottom of the cylindrical portion 122, which beads are designed to cooperate with the wide beads 38 and 40 and the narrow beads 42 and 44 inside the float top inner cylinder 34.

Two of the beads are wide beads 138 and 140, and two of the beads are narrow beads 142 and 144. The wide bead 138 is located intermediate the narrow bead 142 and the narrow bead 144, the narrow bead 142 is located intermediate the wide bead 138 and the wide bead 140, the wide bead 140 is located intermediate the narrow bead 142 and the narrow bead 144, and the narrow bead 144 is located intermediate the wide bead 140 and the wide bead 138.

The narrow beads 142 and 144 are similar to the narrow bead 44 shown in cross-section in FIG. 4, only facing outwardly around outer surface of the cylindrical portion 122 of the float cap 120 rather than inwardly around the interior surface of the float top inner cylinder 34. Likewise, the wide beads 138 and 140 are similar to the wide bead 40 shown in cross-section in FIG. 5, only again facing outwardly around the outer surface of the cylindrical portion 122 of the float cap 120 rather than inwardly around the interior surface of the float top inner cylinder 34. The wide beads 138 and 140 have the same height in cross section as the narrow beads 142 and 144, but the wide beads 138 and 140 project further outwardly from the cylindrical portion 122 of the float cap 120 than do the narrow beads 42 and 44.

The wide beads 138 and 140 of the float cap 120 may be (and are in the preferred embodiment) approximately the same size as the wide beads 38 and 40 of the float top 30. Similarly, the narrow beads 140 and 142 of the float cap 120 may be (and are in the preferred embodiment) approximately the same size as the narrow beads 40 and 42 of the float top 30. In the preferred embodiment the wide beads 138 and 140 project outwardly from the cylindrical portion 122 of the float cap 120 approximately four times as far as do the narrow beads 142 and 144. Again, as a matter of practicality, the wide beads 138 and 140 should project inwardly at least twice as far as do the narrow beads 142 and 144.

Each of the narrow beads 142 and 144 extend around the outside of the cylindrical portion 122 of the float cap 120 for slightly more than ninety degrees, and each of the wide beads 138 and 140 extend around the outside of the cylindrical portion 122 of the float cap 120 for slightly less than ninety degrees. In the preferred embodiment, on the float cap 120 (as on the float top 30) each of the narrow beads 142 and 144 extend around the outside of the cylindrical portion 122 of the float cap 120 for ninety-three degrees, and each of the wide beads 138 and 140 extend around the outside of the cylindrical portion 122 of the float cap 120 for eighty-seven degrees.

It will be perceived that the float cap 120 may be installed onto the float top 30 by aligning the beads on the float cap 120 with the opposite type beads on the float top 30, and lowering the cylindrical portion 122 of the float cap 120 into the float top inner cylinder 34. That is, for example, the wide beads 138 and 140 of the float cap 120 may be aligned with the narrow beads 42 and 44, respectively, of the float top 30, and the narrow beads 142 and 144 of the float cap 120 may be aligned with the wide beads 38 and 40, respectively, of the float top 30.

The float cap 120 may then be pressed down with the cylindrical portion 122 of the float cap 120 extending into the float top inner cylinder 34 until the flat portion 124 of the float cap 120 prevents the float cap 120 from being lowered further onto the float top 30. The float cap 120 may then be rotated ninety degrees to lock the float cap 120 onto the float top 30 with like beads on the float cap 120 and the float top 30 aligned. That is, for example, the wide beads 138 and 140 of the float cap 120 will be aligned with the wide beads 40 and 38, respectively, of the float top 30, and the narrow beads 142 and 144 of the float cap 120 will be aligned with the narrow beads 42 and 44, respectively, of the float top 30.

In the preferred embodiment, the inner radii of the curvature of the wide beads 38 and 40 around the inner surface of the float top inner cylinder 34 are slightly greater than the outer radii of the curvature of the narrow beads 142 and 144 around the cylindrical portion 122 of the float cap 120, and the inner radii of the curvature of the narrow beads 42 and 44 around the inner surface of the float top inner cylinder 34 are slightly greater than outer radii of the wide beads 138 and 140 around the cylindrical portion 122 of the float cap 120. This means that each time the float cap 120 is inserted onto or pulled off of the float top 30, there will be a pressing-type interference fit requiring the float cap 120 to be pressed onto or pulled off of the float top 30 with a force sufficient to overcome the pressing-type interference fit.

In addition, by locating the top edge of the wide beads 138 and 140 on the float cap 120 sufficiently closer to the flat portion 124 than the bottom edge of the wide beads 38 and 40 are to the surface of the float top 30 on which the flat portion 124 of the float cap 120 sits, the wide beads 38 and 40 on the float top 30 will contact the wide beads 138 and 140 on the float cap 120 in a rotational interference fit when the float cap 120 is inserted and turned on the float top 30. When the float cap 120 is turned ninety degrees, the rotational interference fit will make it essentially impossible to pull the float cap 120 off of the float top 30 when it has been turned ninety degrees to align like beads in a locked position.

It will also be appreciated that once the float cap 120 is locked onto the float top 30, turning the float cap 120 ninety degrees on the float top 30 requires force sufficient to overcome the rotational interference fit between the wide beads 38 and 40 and the wide beads 138 and 140. Even if the float cap 120 is turned the ninety degrees on the float top 30, the pressing-type interference fit must still be overcome to remove the float cap 120 from the float top 30. This two-stage interference fit of the float cap 120 onto the float top 30 makes the float cap 120 essentially childproof.

The reason for having the wide beads 38, 40, 138, and 140 extending circumferentially for less than ninety degrees each and the narrow beads 42, 44, 142, and 144 extending circumferentially for greater than ninety degrees each is now apparent. If the wide beads 38, 40, 138, and 140 were ninety degrees, it would be difficult to install or remove the float cap 120 from the float top 30, since an exact alignment would be required. By making the wide beads 38, 40, 138, and 140 approximately eighty-seven degrees in the preferred embodiment, and making the narrow beads 42, 44, 142, and 144 approximately ninety-three degrees, a plus-or-minus three degree rotational error is allowed in installing the float cap 120 onto or removing it from the float top 30.

Arrows may be located on the float cap 120 and on the float top 30 to assist in aligning the float cap 120 and the float top 30 in their respective open or locked positions. In FIG. 17, a position-indicating arrow 146 is located on the top side of the circular flat portion 124 of the float cap 120 near the outer edge thereof. In FIG. 1, an open position arrow 148 is placed on the top surface 36 of the float top 30 near the inner edge thereof in a position for alignment with the position-indicating arrow 146 on the float cap 120 when the float cap 120 is in an open position with respect to the float top 30 (meaning it can be pressed on or pulled off). Also in FIG. 1, a closed position arrow 150 located ninety degrees from the open position arrow 148 is placed on the top surface 36 of the float top 30 near the inner edge thereof in position for alignment with th position-indicating arrow 146 on the float cap 120 when the float cap 120 is in a closed position with respect to the float top 30 (meaning it can not be pressed on or pulled off).

Referring now to FIG. 20, a cord retainer 160 for insertion into the cord retainer recess 46 on the float top 30 is illustrated. The cord retainer 160 has a tapered shoulder 162 thereon for engagement with the reduced diameter shoulder 48 in the cord retainer recess 46 in the float top 30. The taper on the tapered shoulder 162 allows it to move with some initial force past the reduced diameter shoulder 48, with removal of the cord retainer 160 requiring substantially a greater amount of force. Prior to insertion of the cord retainer 160 into the cord retainer recess 46 on the float top 30, one end of a tether cord 164 is attached to the cord retainer 160. In FIG. 20, the one end of the tether cord 164 is inserted through an aperture in the cord retainer 160 and knotted to prevent 164 from being pulled through the aperture in the cord retainer 160.

The other end on the tether cord 164 is tied to a retainer hook 166 attached to a flat support surface 168. Installed on the flat support surface 168 is an adhesive 170 for retaining the flat support surface 168 and the retainer hook 166 on the side of a swimming pool. In the preferred embodiment a segment of double-sided waterproof tape is used to secure the flat support surface 168 to the side of the swimming pool. The restraining tether is the subject of the above-identified copending patent application entitled "Swimming Pool Chemical Dispenser With Restraining Tether."

An assembled floating feeder 175 constructed according to the teachings of the present invention is illustrated in FIG. 22. It will be appreciated that the floating feeder 175 also incorporates the inventions of the related applications identified above. As such, the floating feeder 175 includes a number of advantages and improvements over the art.

It is now apparent that the present invention teaches a floating feeder which is both highly effective and easily and inexpensively manufactured. All complex molding forms are avoided in the manufacturing of the feeder, thereby requiring only simple and inexpensive molds in the manufacture of the components for the device. The invention uses only a single adhesive operation to seal the float assembly, and uses snap-together assembly to the greatest extent possible.

The invention inhibits rotation of the relative parts, preventing flimsy designs susceptible to both breakage and accidental readjustment of the feeder metering apertures. The improved floating dispenser of the present invention has excellent strength and durability characteristics to ensure a long life. All of the aforesaid advantages and objectives are attained while incurring no relative disadvantage whatsoever.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A floating device for continuously dispensing chemical into a swimming pool at a controlled, preselected rate, comprising:

an upper chamber including an outer wall, an inner wall defining an aperature extending from the top to the bottom of said upper chamber, and a top extending between said outer wall and said inner wall, said upper chamber being open to the bottom side thereof, said upper chamber having a top and a bottom;

a lower chamber including an outer wall, an inner wall defining an aperature extending from the top to the bottom of said lower chamber, and a bottom extending between said outer wall and said inner wall of said lower chamber, said lower chamber being open on the top side thereof, said lower chamber having a top and a bottom;

means for securing said bottom of said upper chamber to said top of said lower chamber to make a sealed chamber including said upper and lower chambers;

a shoulder on the inside of said inner wall of said lower chamber near said bottom thereof;

a metering valve mounted to said bottom of said lower chamber, said metering valve having a top edge;

a shoulder on the outside of said metering valve near said top thereof, said shoulder on said metering valve being of a larger outer diameter than the inner diameter of said shoulder on said lower chamber, said shoulders preventing said metering valve from being removed from said lower chamber once installed;

a plurality of tabs extending inwardly at equally spaced increments around the inner circumference of said inner wall of said lower chamber near said bottom thereof;

a plurality of notches at equally spaced increments extending longitudinally from said top edge of said metering valve downward, said notches being arranged and configured to accept said tabs when said top edge of said metering valve is inserted into said bottom of said lower chamber, thereby inhibiting rotational movement of said metering valve with respect to said lower chamber; and removable means for closing the aperature in said top of said top chamber.

2. A device as defined in claim 1, wherein said securing means comprises:

a cylindrical tongue mounted on said bottom of said upper chamber on said outer wall of said upper chamber;

a cylindrical tongue mounted on said bottom of said upper chamber on said inner wall of said upper chamber;

a cylindrical groove located in said top of said lower chamber on said outer wall of said lower chamber for receiving said cylindrical tongue on said bottom of said upper chamber on said outer wall of said upper chamber; and a cylindrical groove located in said top of said lower chamber on said inner wall of said lower chamber for receiving said cylindrical tongue on said bottom of said upper chamber on said inner wall of said upper chamber.

3. The device as set forth in the claim 1 which further includes tether means secured to said device to maintain said device in a predetermined position within a pool.

4. A floating device for continuously dispensing a chemical into a swimming pool at a controlled, preselected rate, comprising:

a float top defining a first volume open only at the bottom of said float top, said float top having a top and a bottom, said float top also having a centrally located first aperture therethrough which first aperture is open at said top and at said bottom of said float top;

a float bottom defining a second volume open only at the top of said float bottom, said float bottom having a top and a bottom, said float bottom also having a centrally located second aperture therethrough which second aperture is open at said top and at said bottom of said float bottom, said bottom of said float top being sealingly attached to said top of said float bottom to create an enclosed volume including said first and said second volumes, said first aperture communicating with said second aperture;

a metering valve body having an upper segment for insertion into the interior of said second aperture at said bottom of said float bottom, said metering valve body having a plurality of apertures therethrough, said metering valve body having a top and a bottom;

a shoulder protruding inwardly from said second aperture at said bottom of said float bottom;

a tapered shoulder extending around the outer edge of said metering valve body near said top thereof, said tapered shoulder being arranged and configured to allow said top of said metering valve body to be forceably inserted into the inner diameter of said shoulder in said second aperture, said tapered shoulder once inserted past said shoulder in said second aperture retaining said metering valve assembly in said second aperture;

a plurality of tabs extending inwardly at equally spaced increments around the inner circumference of said second aperture near said bottom of said float bottom;

a plurality of notches at equally spaced increments around said top of said metering valve body, which notches extend longitudinally from said top of said metering valve body downward and are arranged and configured to accept said tabs when said top of said metering valve body is inserted into said bottom of said float bottom into said second aperture, thereby preventing rotation of said metering valve body relative to said float bottom;

a metering valve cap for movable mounting on said metering valve body, said metering valve cap selectively opening and closing said apertures through said metering valve body; and a cap for closing said first aperture at said top of said float top.

5. A device as defined in claim 4, wherein each of said plurality of tabs has an essentially square cross-section with a rounded surface at the bottom ends thereof.

6. A device as defined in claim 4, wherein there are three of said tabs and three of said notches to receive said three tabs.

7. The device as set forth in claim 4 which further includes tether means secured to said device to maintain said device in a predetermined position within a pool.

8. A device as defined in claim 4, wherein said float top comprises:

a first cylindrical segment having a top and a bottom;

a second cylindrical segment having a top and a bottom, said second cylindrical segment having an outer diameter smaller than the inner diameter of said first cylindrical segment and being located inside said first cylindrical segment, the interior of said first cylindrical segment defining said first aperture; and a top segment for closing the area between the tops of said first and second cylindrical segments.

9. A device as defined in claim 8, wherein said float bottom comprises:

a third cylindrical segment having a top and a bottom;

a fourth cylindrical segment having a top and a bottom, said fourth cylindrical segment having an outer diameter smaller than the inner diameter of said third cylindrical segment and being located inside said third cylindrical segment, the interior of said fourth cylindrical segment defining said second aperture; and a bottom segment for closing the area between the bottoms of said third and fourth cylindrical segments.

10. A device as defined in claim 9, wherein said bottom of said first cylindrical segment is sealingly connected to said top of said third cylindrical segment and said bottom of said second cylindrical segment is seaingly connected to said top of said fourth cylindrical segment to form said sealed volume defined by said first and second volumes.

11. A device as defined in claim 9, additionally comprising:

a cylindrical tongue mounted on the bottom of said first cylindrical segment;

a cylindrical tongue mounted on the bottom of said second cylindrical segment;

a cylindrical groove located in the top of said third cylindrical segment for receiving said cylindrical tongue on the bottom of said first cylindrical segment; and a cylindrical groove located in the top of said fourth cylindrical segment for receiving said cylindrical tongue on the bottom of said second cylindrical segment.

12. A device as defined in claim 11, wherein said cylindrical tongues are held in their respective cylindrical grooves by an adhesive seal.

13. A device as defined in claim 11, additionally comprising:

a raised bead on the bottom of each cylindrical tongue to maintain each of said cylindrical tongues above the bottom of their respective grooves.

* * * * *